(12) United States Patent
Zhang

(10) Patent No.: US 7,316,982 B2
(45) Date of Patent: Jan. 8, 2008

(54) CONTROLLING CARBON NANOTUBES USING OPTICAL TRAPS

(75) Inventor: Yuegang Zhang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 10/746,078

(22) Filed: Dec. 24, 2003

(65) Prior Publication Data

US 2005/0147373 A1 Jul. 7, 2005

(51) Int. Cl.
*H01L 21/31* (2006.01)
*H01L 21/469* (2006.01)

(52) U.S. Cl. ......... 438/758; 257/E51.04; 257/E51.039; 257/E23.074; 977/700; 977/734; 977/742; 977/842; 438/7

(58) Field of Classification Search ................ 438/758; 977/742, 734, 700
See application file for complete search history.

(56) References Cited

U.S. PATENT DOCUMENTS

| | | | |
|---|---|---|---|
| 5,079,169 A | | 1/1992 | Chu |
| 5,170,890 A | * | 12/1992 | Wilson et al. ............... 209/3.1 |
| 6,974,926 B2 | * | 12/2005 | Zhang et al. ............... 209/129 |
| 2003/0066956 A1 | | 4/2003 | Gruber et al. |
| 2003/0183560 A1 | | 10/2003 | Hannah |
| 2003/0196885 A1 | | 10/2003 | Marchitto et al. |
| 2006/0115640 A1 | * | 6/2006 | Yodh et al. ................. 428/221 |

OTHER PUBLICATIONS

Ito Syoji et al., "Laser Manipulation and Fixaton of Single Gold Nanoparticles in Solution at Room Temperatore", Applied Physics Letters, American Institute of Physics, New York, vol. 80, No. 3, Jan. 21, 2002, pp. 482-484.
Debjit Chattopadhyay. "A Route for Bulk Separation of Semiconducting from Metallic Single-Wall Carbon Nanotubes", J.AM. Chem. Soc. 2003, vol. 125, pp. 3370-3375.
M.S. Dresselhaus, "Single Nanotube Raman Spectroscopy", Accts. of Chem. Research, vol. 35, No. 12, Dec. 2002.
M.S. Dresselhaus, "Phonons in Carbon Nanotubes", Advances in Physics, 2000, vol. 49, No. 6, pp. 705-814.
H. Kataura, "Optical Properties of Single-Wall Carbon Nanotubes", Synthetics Metals 103 (1999), pp. 2555-2558.
R. Krupke, " Separation of Metallic From Semiconducting Single-Walled Carbon Nanotubes", www.sciencexpress.org/26June2003/page1/10.1126/science.1086534.

* cited by examiner

*Primary Examiner*—Michael Lebentritt
*Assistant Examiner*—Abdulfattah Mustapha
(74) *Attorney, Agent, or Firm*—Blakely, Sokoloff, Taylor & Zafman LLP

(57) ABSTRACT

An embodiment of the present invention is a technique to control carbon nanotubes (CNTs). A laser beam is focused to a carbon nanotube (CNT) in a fluid. The CNT is responsive to a trapping frequency. The CNT is manipulated by controlling the focused laser beam.

15 Claims, 4 Drawing Sheets

CONTROLLING CARBON NANOTUBES USING OPTICAL TRAPS

BACKGROUND

1. Field of the Invention

Embodiments of the invention relate to the field of semiconductor, and more specifically, to nanotechnology.

2. Description of Related Art

Carbon nanotubes are promising elements in nanotechnology. They are fullerene-related structures which consist of graphene cylinders. Carbon nanotubes can be functionalized (by attaching moieties to nanotubes) to increase their solubility in solvents and to control their affinity with other molecules or solid materials.

Current methods for nanotube separation are centrifuge and liquid chromatography based on chemical affinity. Trapping is done on the edge of electrode in dielectrophoresis. For nanotube manipulation, current methods are based on scanning probe microscope and direct current (DC) or alternate current (AC) electrical field alignment. These techniques are not precise and flexible to be used in a variety of applications.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention is a technique to control carbon nanotubes (CNTs). A laser beam is focused to a carbon nanotube (CNT) in a fluid. The CNT is responsive to a trapping frequency. The CNT is manipulated by controlling the focused laser beam.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, a method of manufacturing or fabrication, etc.

Figure 1:
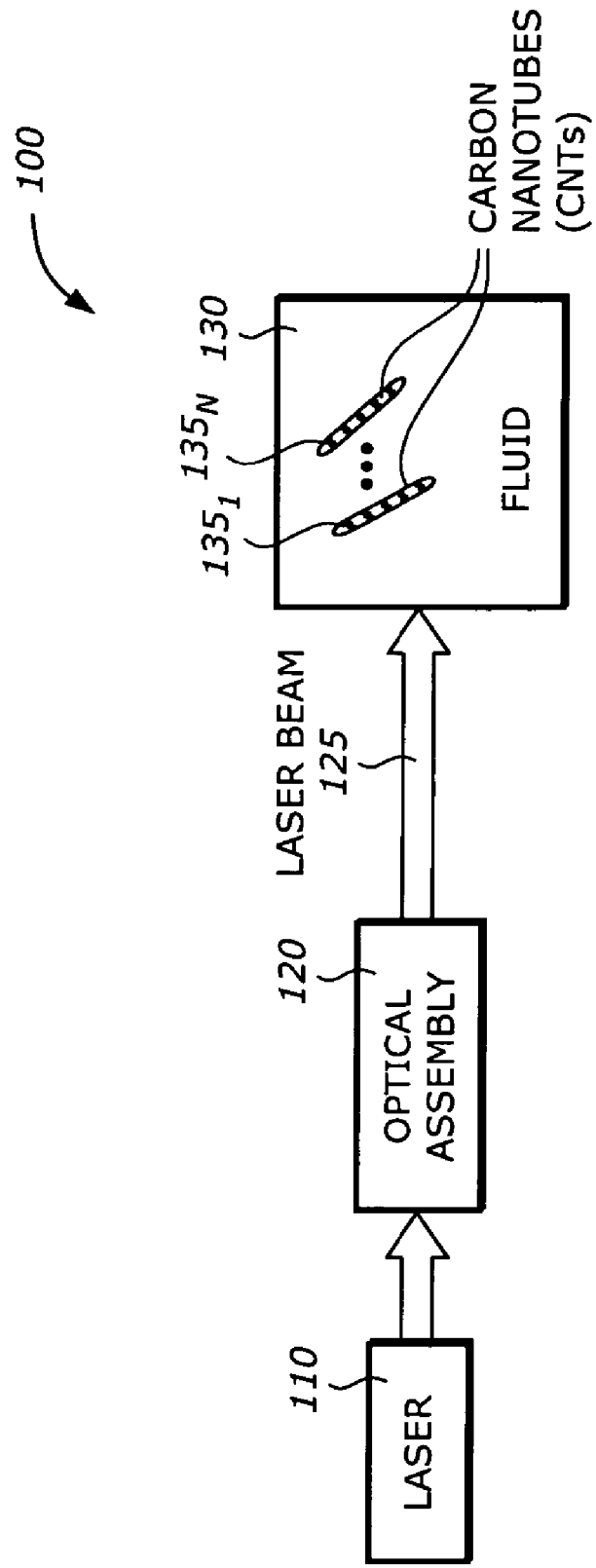
FIG. 1 is a diagram illustrating a system in which one embodiment of the invention can be practiced.

FIG. 1 is a diagram illustrating a system 100 in which one embodiment of the invention can be practiced. The system 100 includes a laser 110, an optical assembly 120, and a fluid 130.

The laser 110 focuses a laser beam 125 to the chamber 130 through the optical assembly 120. The laser 110 may be controlled to have a number of operating modes. It can be controlled to have varying intensities and optical frequencies. It may be polarized.

The optical assembly 120 provides optical elements to process the laser beam 125. Examples of the optical elements includes diffractive optics, lenses, telescopic lenses, optical modulators, and filters. The optical assembly 120 directs the laser beam 125 to carbon nanotubes (CNTs) in the fluid 130.

The fluid 130 includes multiple layers or channels of different fluids. It may be contained in a fluidic channel or container made by glass or a polymeric material. The fluid 130 includes a number of CNTs $135_1$ to $135_N$. The CNTs may be single-walled CNTs (SWNTs) or multi-walled CNTs (MWNTs). The CNTs may be functionalized.

The system 100 allows controlling the CNTs in the fluid 130 in a number of ways. The manipulation includes trapping a certain class of CNTs, moving a trapped CNT, releasing a trapped CNT, and aligning the trapped CNTs. The use of the laser 110 to manipulate the CNTs is based on the concept of optical dipole traps.

A focused laser beam can trap a neutral particle or molecule through the interaction between the electric field of the laser beam and the spontaneous dipole momentum induced in the particle or molecule. The induces dipole momentum of a neutral particle in the electric filed of a laser beam can be expressed as:

$$P = \epsilon_0 \chi E \quad (1)$$

where P is the polarization or dipole momentum per unit volume, $\epsilon_0$ is the permittivity of free space, $\chi$ is the dielectric susceptibility, and E is the electric field.

The potential energy may be expresses as:

$$U = (-\tfrac{1}{2}) \langle P \cdot E \rangle = (-\tfrac{1}{2}) \epsilon_0 \chi \langle E \rangle^2 \quad (2)$$

The dielectric susceptibility may be expressed in a complex form as a function of frequency as follows:

$$\chi(\omega) = \chi'(\omega) + i\chi''(\omega) \quad (3)$$

where $\chi'(\omega)$ is the real part and $\chi''(\omega)$ is the imaginary part.

When $\omega < \omega_0$, $\chi'(\omega) > 0$, where $\omega_0$ is a resonant frequency.

From equation (2), it is derived that the potential energy U decreases when the light intensity increases. Furthermore, the particle tends to move to an area of higher E and is trapped at the center of a laser beam, assuming that the optical intensity distribution of the laser beam is Gaussian.

Depending on the diameter and chirality, a SWNT may be metallic or semiconductor. The electron density of states of a SWNT is composed of many spikes, called the van Hove singularities. The energy gaps between the corresponding van Hove singularities are optically allowed inter-band transition energies. By choosing a proper laser frequency or continuously tuning the laser frequency, a certain type of nanotubes can be trapped. A MWNT is an assembly of multiple SWNTs with different diameters and chiralities. The trapping of a MWNT depends on its composition, i.e., ratio of different SWNT types. A laser frequency that can trap all types of SWNTs can also trap MWNTs.

The nanotubes can also be aligned using a polarized laser beam. The dipole is always parallel to the axis of the nanotube. The polarization P may be decomposed into a parallel component $P_p$ and an orthogonal component $P_o$:

$$P = P_P + P_o \approx P_P = \epsilon_0 \chi E_p \quad (4)$$

where $E_p$ is the parallel component of E.

The potential energy can then be expressed as:

$$U=(-\tfrac{1}{2})<P\cdot E>=(-\tfrac{1}{2})<E_p>^2 \cos\theta \qquad (5)$$

where θ is the angle between E and the axis of a CNT.

Figure 2:
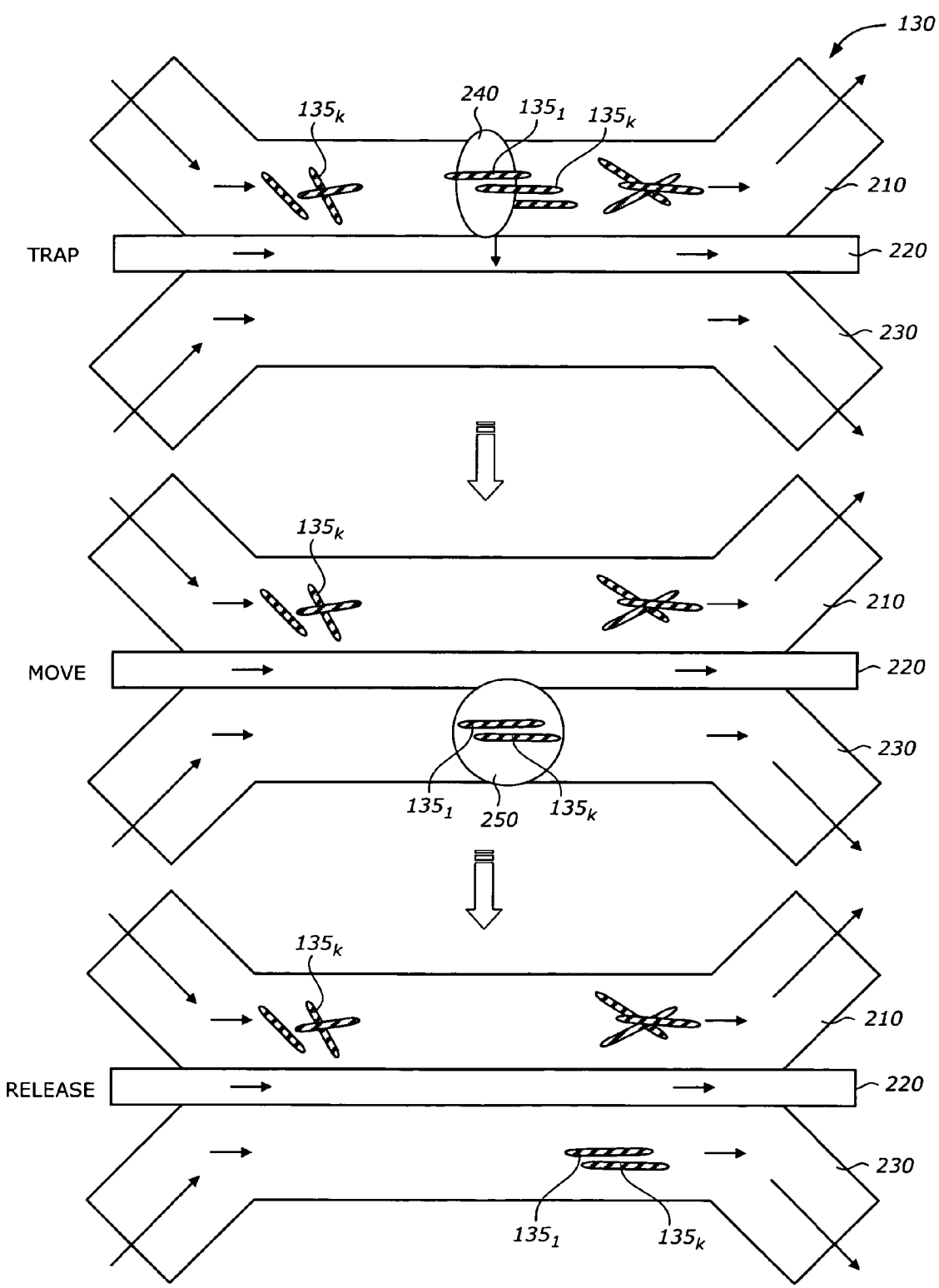
FIG. 2 is a diagram illustrating manipulation of CNTs according to one embodiment of the invention.

From the above equations, an increase in E leads to a decrease in U. Also, a decrease in θ leads to a decrease in U when $\omega<\omega_0$, $\chi'(\omega)>0$. Therefore, CNTs can be trapped and aligned by polarized laser beam FIG. 2 is a diagram illustrating manipulation of CNTs according to one embodiment of the invention. The fluid 130 includes a first layer 210, a buffer layer 220, and a second layer 230.

The three layers 210, 220, and 230 are laminar flow layers. The buffer layer 220 prevents the random diffusion of the CNTs between the first and second layers 210 and 230. The first layer 210 contains a number of free CNTs $135_1$ to $135_N$.

The laser beam is focused to capture the CNT $135_k$ at the site 240 in the first layer 210. The laser beam is focused with a specific frequency, referred to as a trapping frequency, to selectively trap and/or release the CNT $135_k$ that is responsive to this trapping frequency. Once the CNT $135_k$ is trapped, it can be moved and released by controlling the laser beam.

To move the CNT $135_k$, the position of the focal point of the laser is changed from the site 240 to a site 250 in the second layer 230. The laser can be precisely moved and therefore the movement of the CNT $135_k$ can be precisely controlled. Once the CNT $135_k$ is moved to a new location, it can be released.

The trapped CNT $135_k$ can be released at either the first layer 210 or the second layer 230 at any location, e.g., the sites 240 or 250 using a number of methods. In the first method, the laser 110 is simply turned off, cutting off the laser beam. The electric field is removed and the CNT $135_k$ becomes free. In the second method, the laser beam is blocked, either by an optical or mechanical blocker. In the third method, the laser intensity is reduced by using a filter in the optical assembly 120 or in the laser 110 itself. In the fourth method, the frequency of the laser 110 is changed to be different than the trapping frequency. In the fifth method, the fluid at the second layer 230 is replaced with another fluid with different viscosity or dielectric constant from the first layer 210. In the sixth method, the laser beam moves across a liquid-solid interface (e.g. the wall of a microfluidic channel).

The trapping, moving, and release of the CNTs may be performed continuously by synchronizing the sweeping of the laser beam and the event of releasing the CNTs.

Figure 3:
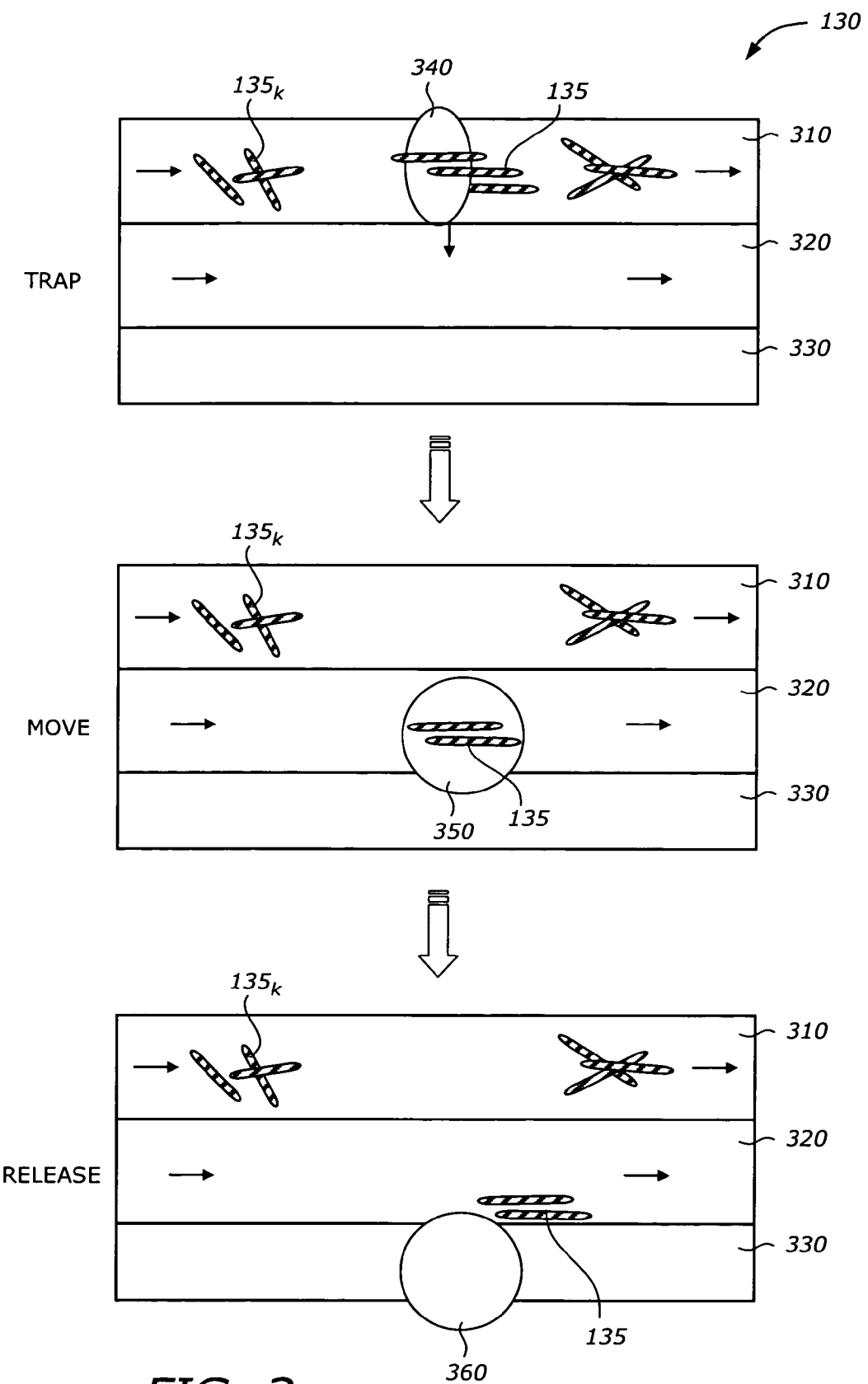
FIG. 3 is a diagram illustrating manipulation of CNTs using layers with different viscosities according to one embodiment of the invention can be practiced.

FIG. 3 is a diagram illustrating manipulation of CNTs using layers with different viscosities one embodiment of the invention can be practiced. The fluid has three layers 310, 320, and 330.

The laser beam is focused to the CNTs in the first layer 310. The CNT 135 is optically trapped at a site 340. The trapped CNT 135 can be moved to the second layer 320 at a site 350 by moving the laser beam. Then, the trapped CNT 135 is released at the interface of the two laminar flow layers 320 and 330 with different viscosities, when the shear force on the CNT 135 due to the third layer 330 is larger than the laser trapping force.

The laser beam may sweep back and forth between the site 340 and a site 360 in the third layer 330 to trap, move, and release the CNT 135 at the interface between the second and third layers 320 and 330. This technique does not require a modulation of the laser intensity, or varying of frequency to release CNTs.

An extreme case in FIG. 3 is that the layer 330 is a solid (e.g. a wall of a microfluidic channel).

Figure 4:
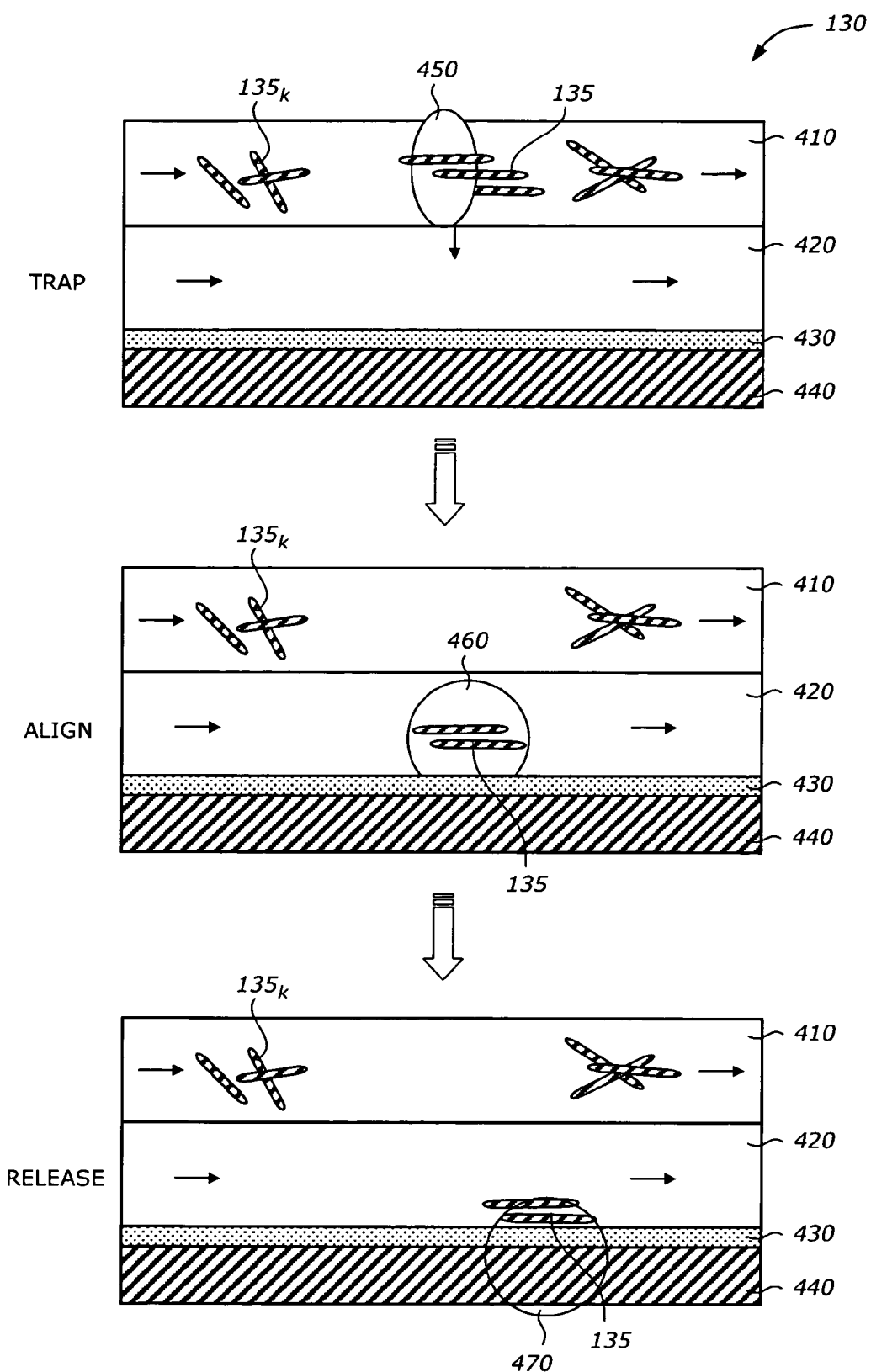
FIG. 4 is a diagram illustrating manipulation of CNTs using polarized laser beam according to one embodiment of the invention.

FIG. 4 is a diagram illustrating manipulation of CNTs using polarized laser beam according to one embodiment of the invention. The fluid 130 includes first, and second layers 410 and 420. A layer 440 is a solid substrate (e.g., glass, silicon). An adhesion layer 430 may be coated on the substrate 440.

The CNT 135 is trapped by the laser beam at a site 450 at the first layer 410. The CNT 135 is responsive to a polarization. The laser is a polarized laser. The CNT 135 is aligned to the orientation as provided by the polarized laser beam. The trapped CNT 135 is moved to a site 460 at the second layer 420 by changing the position of the laser focal point accordingly. The trapped CNT 135 is then released at the surface between the second layer 420 and the adhesion layer 430. The layer 430 provides support for the released CNT 135.

The layer 430 also immobilizes the CNT 135 while keeping its alignment or orientation the same as the laser polarization direction. The layer 430 can be patterned by lithography method to further define the location to where CNT 135 can attach.

If the trapped CNT 135 has high affinity with the surface of the substrate 440, the adhesion layer 430 is not necessary and the immobilization of the CNT 135 may be performed by the substrate layer 440.

The role of the second layer 420 is to prevent CNT from randomly diffusing on to the layer 430 or layer 440. If the CNT concentration in the first layer 410 is dilute enough that the non-specific binding on the surface 430 or 440 is negligible, the second layer 420 is not necessary.

The surface of the substrate layer 440 may be functionalized to immobilize the CNT 135 while keeping its alignment or orientation the same. This can be done by a number of ways. For example, the substrate layer 440 may be coated with a layer 430 of positively charged molecules (e.g. self-assembled 3-Aminopropyltriethoxysilane monolayer) that can bind to the CNT 135 or the functional group or chemical moiety on functionalized CNT 135 when it is near the surface.

The laser beam may sweep back and forth between the site 450 and a site 470 in the substrate layer 440 to trap, align, move, release, and deposit (immobilize) the CNT 135 on the substrate layer 440.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   focusing a laser beam to a carbon nanotube (CNT) in a fluid, the CNT being responsive to a trapping frequency; and
   manipulating the carbon nanotube (CNT) by controlling the focused laser beam.

2. A method comprising:
   focusing a laser beam to a carbon nanotube (CNT) in a fluid, the CNT being responsive to a trapping frequency; and manipulating the carbon nanotube (CNT) by controlling the focused laser beam; wherein manipulating comprises:
trapping the CNT at a trapping site in a first fluidic layer in the fluid by varying frequency of the laser beam to match the trapping frequency.

3. The method of claim 2 wherein manipulating comprises:
moving the trapped CNT from a first site in the first layer to a second site in a second layer in the fluid by changing position of focal point of the laser beam from a first location to a second location.

4. The method of claim 2 wherein manipulating comprises:
releasing the trapped CNT by one of turning off the laser beam, blocking the laser beam, filtering the laser beam to reduce laser intensity, changing frequency of the laser beam, using a different fluidic medium at the second layer having different viscosity or dielectric constant, and moving the laser beam across a liquid-solid interface.

5. The method of claim 2 wherein manipulating comprises:
releasing the trapped CNT at an interface between first and second layers having different viscosities.

6. The method of claim 2 wherein manipulating comprises:
aligning the trapped CNT by polarizing the laser beam.

7. The method of claim 1 wherein manipulating comprises:
immobilizing the CNT by functionalizing a substrate layer.

8. A method comprising:
focusing a laser beam to a carbon nanotube (CNT) in a fluid, the CNT being responsive to a trapping frequency; and
manipulating the carbon nanotube (CNT) by controlling the focused laser beam; wherein focusing comprises:
focusing the laser beam to a multi-walled CNT (MWNT) having a plurality of single-walled CNT (SWNT) to manipulate the MWNT.

9. The method of claim 2 wherein focusing comprises:
focusing the laser beam to a multi-walled CNT (MWNT) having a plurality of single-walled CNT (SWNT) to manipulate the MWNT.

10. The method of claim 8 wherein manipulating comprises:
trapping the CNT at a trapping site in a first fluidic layer in the fluid by varying frequency of the laser beam to match the trapping frequency.

11. The method of claim 8 wherein manipulating comprises:
moving the trapped CNT from a first site in the first layer to a second site in a second layer in the fluid by changing position of focal point of the laser beam from a first location to a second location.

12. The method of claim 8 wherein manipulating comprises:
releasing the trapped CNT by one of turning off the laser beam, blocking the laser beam, filtering the laser beam to reduce laser intensity, changing frequency of the laser beam, using a different fluidic medium at the second layer having different viscosity or dielectric constant, and moving the laser beam across a liquid-solid interface.

13. The method of claim 8 wherein manipulating comprises:
releasing the trapped CNT at an interface between first and second layers having different viscosities.

14. The method of claim 8 wherein manipulating comprises: aligning the trapped CNT by polarizing the laser beam.

15. The method of claim 8 wherein manipulating comprises:
immobilizing the CNT by functionalizing a substrate layer.

* * * * *